(12) United States Patent
Kim

(10) Patent No.: US 8,279,253 B2
(45) Date of Patent: Oct. 2, 2012

(54) IMAGE COMMUNICATING DISPLAY APPARATUS AND IMAGE COMMUNICATION METHOD THEREOF

(75) Inventor: Kyoung-wook Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1295 days.

(21) Appl. No.: 11/934,316

(22) Filed: Nov. 2, 2007

(65) Prior Publication Data

US 2008/0225112 A1 Sep. 18, 2008

(30) Foreign Application Priority Data

Mar. 15, 2007 (KR) .......................... 10-2007-0025732

(51) Int. Cl.
*H04M 11/00* (2006.01)
(52) U.S. Cl. .................................. 348/14.01; 455/550.1
(58) Field of Classification Search ..... 348/14.01–14.08, 348/14.16, 14, 14.15; 455/550, 556, 557; 379/93.02
See application file for complete search history.

(56) References Cited

U.S. PATENT DOCUMENTS

| 5,243,666 | A * | 9/1993 | Hasegawa et al. ............ 382/107 |
| 5,475,421 | A | 12/1995 | Palmer et al. |
| 6,215,515 | B1 | 4/2001 | Voois et al. |
| 6,674,458 | B1 * | 1/2004 | Cohen-Solal et al. ..... 348/14.08 |
| 2001/0041586 | A1 * | 11/2001 | Irube et al. .................... 455/556 |
| 2002/0047892 | A1 | 4/2002 | Gonsalves, Jr. |
| 2002/0048352 | A1 * | 4/2002 | Katayama ................. 379/93.24 |
| 2004/0145654 | A1 | 7/2004 | Motohashi |
| 2004/0189791 | A1 | 9/2004 | Haruki |
| 2006/0193509 | A1 * | 8/2006 | Criminisi et al. ............. 382/154 |
| 2007/0139513 | A1 | 6/2007 | Fang |
| 2008/0095340 | A1 * | 4/2008 | Kim .......................... 379/93.09 |
| 2008/0117282 | A1 | 5/2008 | Cho |
| 2010/0323752 | A1 * | 12/2010 | Park et al. .................. 455/550.1 |

FOREIGN PATENT DOCUMENTS

| CN | 1219319 A | 6/1999 |
| CN | 1386370 A | 12/2002 |
| CN | 1538350 A | 10/2004 |

(Continued)

OTHER PUBLICATIONS

Chinese Office Action issued in Chinese Application No. 200810085536.2, dated Dec. 27, 2010.

(Continued)

*Primary Examiner* — Curtis Kuntz
*Assistant Examiner* — Maria El-Zoobi
(74) *Attorney, Agent, or Firm* — Sughrue Mion, PLLC

(57) ABSTRACT

An image communicating display apparatus includes: an imaging unit that picks up and processes an image signal of an object; a voice input unit that receives a voice signal of the object; an encoder that receives and encodes the image and voice signals and generates information on the object; a decoder that decodes the encoded image and voice signals and an encoded external signal; a network transceiver that transmits the encoded image and voice signals and the information on the object; a controller that controls the encoder, decoder and network transceiver, and outputs a voice guidance instruction signal based on information on a remote party received through the network transceiver; a display unit that displays the decoded image signal; and a voice output unit that outputs the decoded voice signal and outputs a voice guidance announcement based on the voice guidance instruction signal.

18 Claims, 4 Drawing Sheets

FOREIGN PATENT DOCUMENTS

| | | |
|---|---|---|
| CN | 1964469 A | 5/2007 |
| JP | 2002-176679 A | 6/2002 |
| JP | 2004-186778 A | 7/2004 |
| KR | 10-2003-0005119 A | 1/2003 |
| KR | 10-2003-0091834 A | 12/2003 |
| KR | 10-2004-0032245 A | 4/2004 |

OTHER PUBLICATIONS

Non-Final Office Action dated Jun. 24, 2011, issued in U.S. Appl. No. 12/051,409.

Communication from the State Intellectual Property Office of P.R. China dated Aug. 10, 2011, in counterpart Chinese Application No. 200810126396.9.

Final Office Action dated Nov. 1, 2011, issued in U.S. Appl. No. 12/051,409.

Office Action issued May 18, 2012 by the State Intellectual Property Office of the People's Republic of China in counterpart Chinese Application No. 200810126396.9.

* cited by examiner

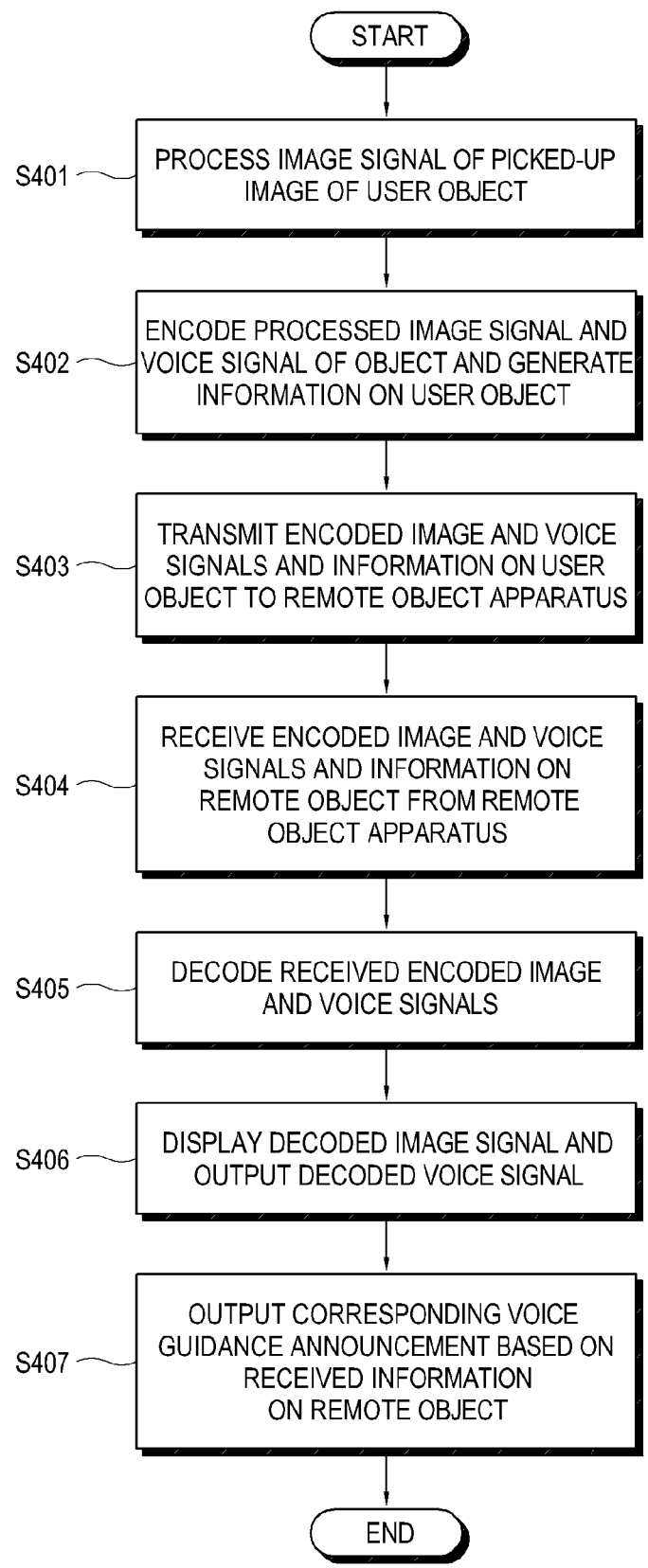

IMAGE COMMUNICATING DISPLAY APPARATUS AND IMAGE COMMUNICATION METHOD THEREOF

CROSS-REFERENCE TO RELATED APPLICATIONS

This application claims priority from Korean Patent Application No. 10-2007-0025732, filed on Mar. 15, 2007 in the Korean Intellectual Property Office, the disclosure of which is incorporated herein by reference.

BACKGROUND OF INVENTION

1. Field of Invention

Apparatuses and methods consistent with the present invention relate to image communication, and more particularly, to image communication in which a number of a remote objects and entrance/exit of the remote objects are informed to a user object by voice.

2. Description of the Related Art

Currently, many image communication solutions appear with increased speed of a dedicated Internet line. In actuality, a program such as Skype has spread to enable users to make inexpensive image communication throughout the world. It is expected that image communication will become very popular in communication devices such as a telephone, although it is still in a tryout phase. Also, such an image communication system will be employed in vehicles in the near future.

However, a user who performs image communication may not be always under a situation where he/she gazes at a display of the image communication system.

For example, if an image communication system is installed within a vehicle and a driver performs image communication while driving, the driver may necessarily avert his/her eyes from a display of the image communication system in order to watch a traffic light, a road sign, other vehicles and the like. In addition, if a party (hereinafter referred to as "a user object") uses a multi-tasking apparatus such as a computer to perform image communication with the other party (hereinafter referred to as "a remote object"), the user object may not watch the image of the remote object during his/her work other than communication with the remote object. In addition, if the user object is visually handicapped, the user object can not watch the image of the remote object in image communication.

SUMMARY OF THE INVENTION

The present invention provides an image communicating display apparatus and an image communication method thereof, which are capable of informing a user object of the number of remote objects and entrance/exit of the remote objects by voice as well as providing a general image communication function According to an aspect of the present invention, there is provided an image communicating display apparatus including: an imaging unit that picks up an image of an object and processes an image signal for the picked-up image of the object; a voice input unit that receives a voice signal; an encoder that receives and encodes the processed image signal and the voice signal of the object and generates information on the object; a decoder that decodes the image and voice signals encoded by the encoder and an encoded signal received from the outside; a network transceiver that transmits and receives the image and voice signals encoded by the encoder and the generated information on the object; a controller that controls the encoder, the decoder and the network transceiver, and outputs a voice guidance instruction signal based on information on a remote party which is received through the network transceiver; a display unit that displays the image signal decoded by the decoder; and a voice output unit that outputs the voice signal decoded by the decoder and outputs a voice guidance announcement based on the voice guidance instruction signal from the controller.

The image communicating display apparatus may further include a memory that stores various kinds of preset voice guidance announcement lists in order to output the voice guidance announcement based on the voice guidance instruction signal from the controller.

The image communicating display apparatus may further include a scaler that is provided between the decoder and the display unit, receives the image signal decoded by the decoder, scales the received image signal, and outputs the scaled image signal to the display unit.

The imaging unit may include an imaging device to pick up the image of the object and an image signal processor to process the image picked up by the imaging device.

The encoder may encode the image signal using a moving picture compression algorithm Moving Picture Experts Group (MPEG)-4.

The network transceiver may include an Ethernet host.

The voice output unit may include an amplifier that amplifies the voice signal decoded by the decoder, and a speaker that outputs communication voice and the voice guidance announcement.

The information on the object may include information on the number of the object and entrance and exit of the object.

According to another aspect of the present invention, there is provided an image communication method including: processing an image signal for a picked-up image of an object; encoding the processed image signal and a voice signal of the object and generating information on the object; transmitting the encoded image and voice signals and the information on the object to an apparatus of a remote party; receiving encoded image and voice signals and information on the remote party from the apparatus of the remote party; decoding the received encoded image and voice signals; displaying the decoded image signal and outputting the decoded voice signal; and outputting a corresponding voice guidance announcement based on the received information on the remote party.

The image communication method may further include, prior to the displaying the decoded image signal, receiving the decoded image signal and scaling the received image signal.

The encoding the image signal may include encoding the image signal using a moving picture compression algorithm.

The encoding the image signal using the moving picture compression algorithm may include cropping only a portion of an entire imaging area in an imaging unit and moving the crop portion along movement of the object to locate the object at a center portion of a screen.

The transmitting the encoded image signal may include stopping the transmission of the image signal if it is determined that an image of the object is not present in an imaging unit of the object.

The outputting the voice guidance announcement may include outputting the voice guidance announcement when the object comes in and out of an angle of view of an imaging unit of the object.

The information on the object may include information on the number of the object and entrance and exit of the object.

BRIEF DESCRIPTION OF THE DRAWINGS

The above and/or other aspects of the present invention will become apparent and more readily appreciated from the following description of the exemplary embodiments, taken in conjunction with the accompanying drawings, in which:

FIG. 4 is a flow chart illustrating an image communication method according to an exemplary embodiment of the present invention.

DETAILED DESCRIPTION OF EXEMPLARY EMBODIMENTS

Figure 1:
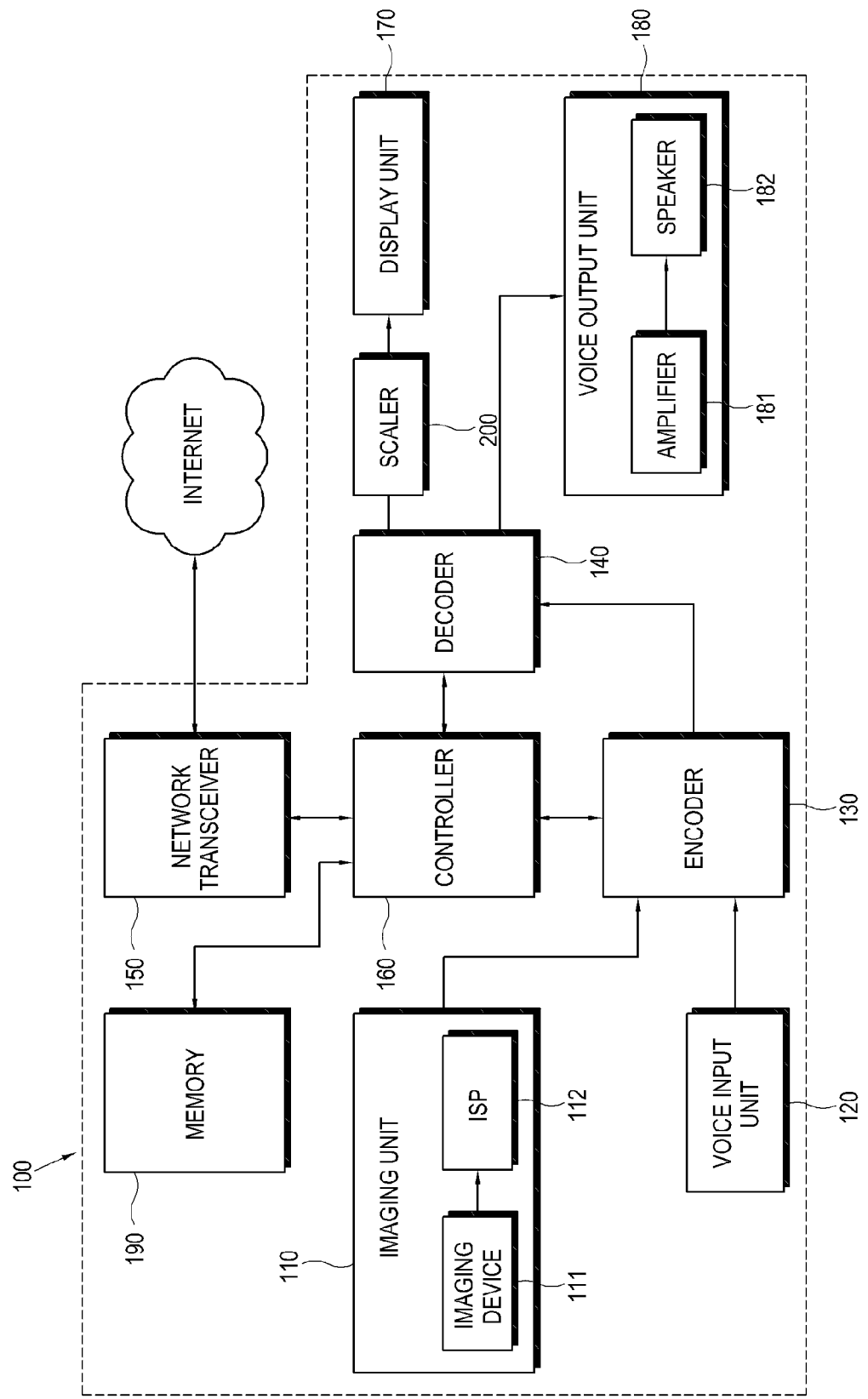
FIG. 1 is a view showing a configuration of an image communicating display apparatus according to an exemplary embodiment of the present invention.

Reference will now be made in detail to exemplary embodiments of the present invention, which are illustrated in the accompanying drawings. The exemplary embodiments are described below so as to explain the present invention by referring to the drawings.

FIG. 1 is a view showing a configuration of an image communicating display apparatus according to an exemplary embodiment of the present invention.

Referring to FIG. 1, an image communicating display apparatus 100 according to an exemplary embodiment of the present invention includes an imaging unit 110, a voice input unit 120, an encoder 130, a decoder 140, a network transceiver 150, a controller 160, a display unit 170 and a voice output unit 180.

The imaging unit 110, e.g., a camera, picks up an image of a user object and processes an image signal of the picked-up image. The imaging unit 110 includes an imaging device 111 for picking up the image of the user object and an image signal processor (ISP) 112 for processing the image picked up by the imaging device 111.

The voice input unit 120, e.g., a microphone, inputs a voice signal. That is, when objects (parties) who perform image communication such as communication (telephone communication) with each other while watching the image of the other object, the objects input a respective communication voice to the voice input unit 120. A microphone may be typically employed as the voice input unit 120.

The encoder 130 receives the image signal processed by the imaging unit 110 and the voice signal of the user object, encodes the received image and voice signals, and generates information on the picked-up user object. In this exemplary embodiment, the encoder 130 may encode the image signal using a moving picture compression algorithm, for example, MPEG-4. In addition, the information on the user object may include information on the number of user objects and entrance and exit of user objects.

The decoder 140 decodes the image and voice signals encoded by the encoder 130. The decoder 140 may also decode encoded signals received from the outside. The decoder 140 may be basically set to decode encoded signals received from the outside. The image communicating display apparatus 100 may also be configured such that the image of the user object and the image of a remote object are simultaneously displayed on the display unit according to selection of the user object.

The network transceiver 150 transmits/receives the image and voice signals encoded by the encoder 130. The network transceiver 150 also transmits the generated information on the user object and receives information on the remote object. The network transceiver 150 may include an Ethernet host.

The controller 160 controls operations of the encoder 130, the decoder 140 and the network transceiver 150, and outputs a voice guidance instruction signal based on the information on the remote object, which is received through the network transceiver 150. The controller 160 may be configured to control the display unit 170 and the voice output unit 180.

In this exemplary embodiment, the image communicating display apparatus 100 may further include a memory 190 that stores various kinds of preset voice guidance announcements in order to output a corresponding voice guidance announcement based on a voice guidance instruction signal from the controller 160.

The display unit 170 displays the image signal decoded by the decoder 130. The display unit 170 may include a cathode ray tube (CRT), a liquid crystal display (LCD), a plasma display panel (PDP) or other displays known in the art.

If an LCD is employed as the display unit 170, the image communicating display apparatus 100 may include a scaler 200 that is provided between the decoder 140 and the display unit 170 to receive the image signal decoded by the decoder 140, scale the received image signal, and output the scaled image signal to the display unit 170.

The voice output unit 180 outputs the voice signal decoded by the decoder 140. The voice output unit 180 also outputs a voice guidance announcement based on a voice guidance instruction signal from the controller 160. The voice output unit 180 may include an amplifier 181 that amplifies the voice signal decoded by the decoder 140, and a speaker 182 that outputs the voice signal and the voice guidance announcement.

Hereinafter, an image communication method using the image communicating display apparatus 100 according to an exemplary embodiment of the present invention will be described.

FIG. 4 is a flow chart illustrating the image communication method according to the exemplary embodiment of the present invention. In this exemplary embodiment, a user object uses the image communicating display apparatus 100 (also referred to as "user object apparatus"), and a remote object uses an image communicating device (also referred to as "remote object apparatus") which is the same as or similar to the image communicating display apparatus 100 of the user object Referring to FIG. 4, first, an image signal of a picked-up image of the user object is processed at operation S401.

Next, the processed image signal and a voice signal of the user object are encoded, and information on the user object is generated at operation S402. In this exemplary embodiment, the image signal may be encoded using a moving picture compression algorithm, for example, MPEG-4.

Figure 2:
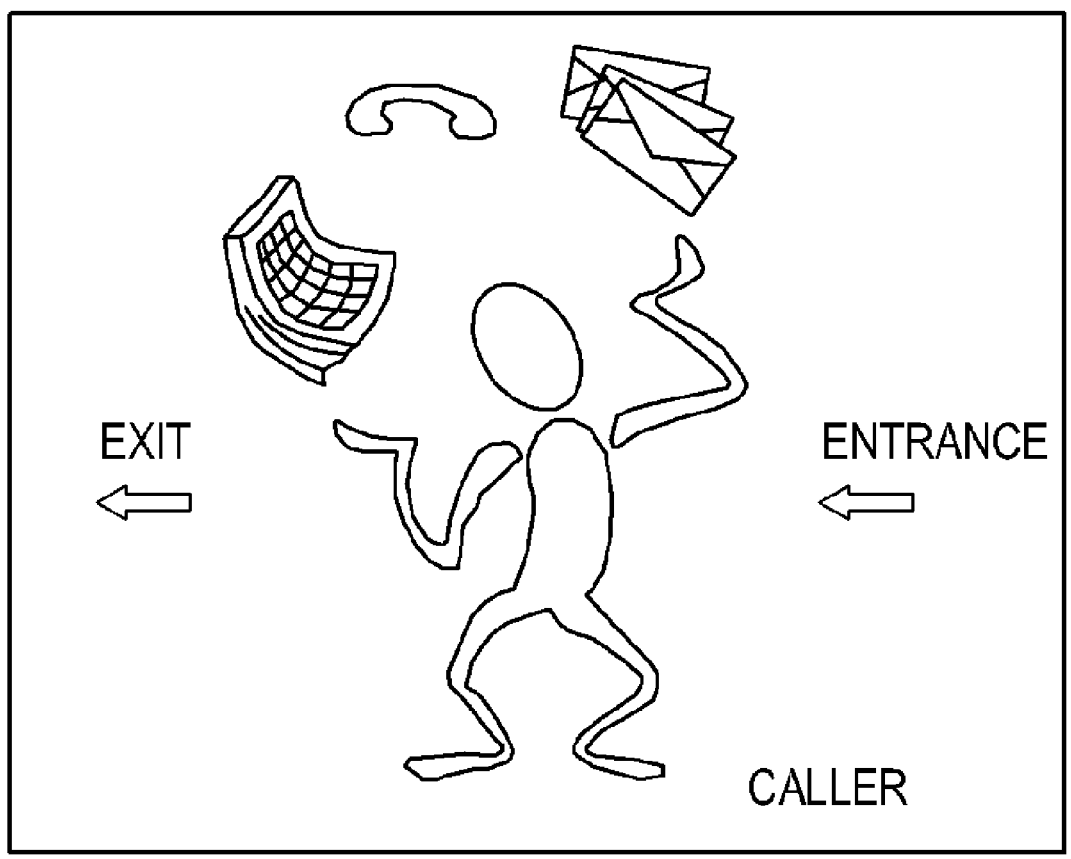
FIG. 2 is a schematic view showing application of an object algorithm of a moving picture codec in an image communication method according to an exemplary embodiment of the present invention.
Figure 3:
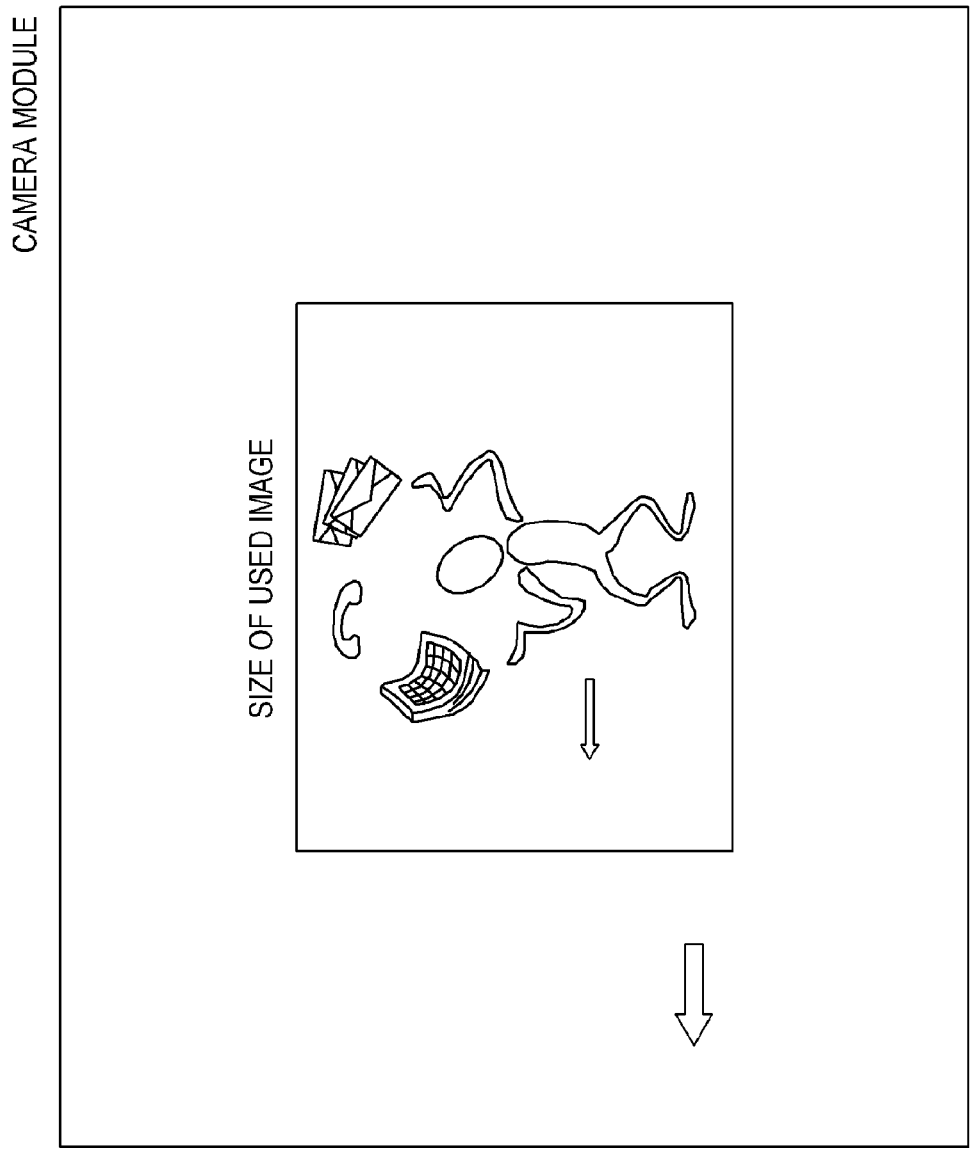
FIG. 3 is a view showing an example of cropping a portion of the entire camera module if a high resolution camera is used in an image communication method according to an exemplary embodiment of the present invention.

Specifically, if an object algorithm of a moving picture codec is applied to a moving picture picked up by the imaging unit 110, each frame of the moving picture is encoded, and screen information on the each frame is generated simultaneously. Based on this generated screen information, the remote object recognizes information on movement such as entrance or exit of the user object on a displayed screen as shown in FIG. 2. In this case, if a high resolution is used for the imaging unit 110, only a portion of the entire imaging area is cropped as shown in FIG. 3 and, the cropped portion may be moved along movement of the user object. That is, the cropped portion may be moved to always locate the user object at the center of the screen. In this exemplary embodiment, the information on the user object may include information on the number of user objects and entrance and exit of user objects.

Upon completing the encoding of the image and voice signals, the encoded image and voice signals and the information on the user object are transmitted to the remote object apparatus at operation S403. At this time, if it is determined that an image of the user object is not present in the imaging unit 110, the transmission of the image signal is stopped. That is, the image is analyzed before the transmitter transmits the image, and if a moving user object is not captured by the imaging unit 110, it is determined that transmitting an image to the remote object is not necessary, and, accordingly, the image transmission is stopped. This is for preventing resource waste due to unnecessary image transmission. On the other hand, the remote object watches the last image of the user object as a freeze frame, and receives an image again from the user object apparatus when a moving user object image appears.

If the image of the user object is not transmitted to the remote object apparatus, an image of the remote object picked up by an imaging unit of the remote object apparatus which is the same as or similar to the imaging unit 110 of the image communicating display apparatus 100 may be displayed simultaneously. In this case, while the image of the remote object picked up by the imaging unit of the remote object apparatus is displayed on a display unit which is the same as or similar to the display unit 170 of the image communicating display apparatus 100 through the encoding and decoding processes, movement of the user object in the picked-up image may be detected.

Upon completing the transmission of the encoded image and voice signals for the picked-up image of the user object, encoded image and voice signals and information on the remote object are received from the remote object apparatus at operation S404. Thereafter, the received encoded image and voice signals are decoded at operation S405. Next, the decoded image signal is displayed and the decoded voice signal is outputted at operation S406. Prior to the operation of displaying the decoded image signal, there may further be included an operation of scaling the decoded image signal.

Next, a corresponding voice guidance announcement is outputted based on the received information on the remote object at operation S407. That is, a change of the number of remote objects and a change of the state such as entrance and exit of the remote objects are informed by voice. Accordingly, the user object who conducts communication with the remote object can recognize the change of the state of the remote object even when the user object can not watch the remote object image in some situations. At this time, when the remote object comes in and out of an angle of view of the imaging unit of the remote object apparatus, the voice guidance announcement is outputted for both cases.

As apparent from the above description, the present invention provides an image communicating display apparatus and an image communication method, in which the number of remote objects and entrance/exit of the remote objects are informed to a user object by voice as well as providing a general image communication function, thereby increasing utility of image communication and providing the visually handicapped with an opportunity to use the image communicating display apparatus.

Although a few exemplary embodiments of the present invention have been shown and described, it will be appreciated by those skilled in the art that changes may be made in these exemplary embodiments without departing from the principles and spirit of the invention, the scope of which is defined in the appended claims and their equivalents. For example, it is obvious to those skilled in the art that the image communication method of the present invention can be applied, by a simple design change, to not only image communication systems but also specified security or crime prevention systems that operate CCTV systems, building-type large-sized parking places, underground parking places of apartments and the like.

What is claimed is:

1. An image communicating display apparatus comprising:
    an imaging unit that picks up an image of at least one user object, from a number n of objects, the number n being equal to or greater than 1, and processes an image signal for the picked-up image of the user object;
    a voice input unit that inputs a voice signal;
    an encoder that receives and encodes the processed image signal and the voice signal of the user object, and generates information on the user object;
    a decoder that decodes the image and voice signals of the user object encoded by the encoder, and encoded image and voice signals of at least one remote object, from a number m of objects, the number m being equal to or greater than 1;
    a network transceiver that transmits the image and voice signals of the user object encoded by the encoder and the generated information on the user object, and receives the encoded image and voice signals of the remote object and information on the remote object;
    a controller that controls the encoder, the decoder and the network transceiver, and outputs a voice guidance instruction signal based on the information on the remote object;
    a display unit that displays at least one of the image signal of the user object decoded by the decoder, and the image signal of the remote object decoded by the decoder; and
    a voice output unit that outputs at least one of the voice signal of the user object decoded by the decoder and the voice signal of the remote object decoded by the decoder, and outputs a voice guidance announcement based on the voice guidance instruction signal output by the controller.

2. The image communicating display apparatus according to claim 1, further comprising a memory that stores a plurality of guidance announcements in order to output the voice guidance announcement based on the voice guidance instruction signal output by the controller.

3. The image communicating display apparatus according to claim 1, further comprising a scaler that scales at least one of the image signal of the user object decoded by the decoder and the image signal of the remote object decoded by the decoder, and outputs the scaled image signal to the display unit.

4. The image communicating display apparatus according to claim 1, wherein the imaging unit comprises an imaging device that picks up the image of the user object, and an image signal processor that processes the image of the user object picked up by the imaging device.

5. The image communicating display apparatus according to claim 1, wherein the encoder encodes the image signal of the user object using a moving picture compression algorithm.

6. The image communicating display apparatus according to claim 1, wherein the network transceiver comprises an Ethernet host.

7. The image communicating display apparatus according to claim 1, wherein the voice output unit comprises an amplifier that amplifies the voice signal decoded by the decoder, and a speaker that outputs the amplified voice signal and the voice guidance announcement.

8. The image communicating display apparatus according to claim 1, wherein the information on the remote object comprises:
 information on the number m of the remote objects, and
 information on entrance and exit of the remote object with respect to an angle of view of an imaging unit of a remote object apparatus used by the remote object for the image communication.

9. The image communicating display apparatus according to claim 1, wherein the information on the user object comprises:
 information on the number n of the user objects, and
 information on entrance and exit of the user object with respect to an angle of view of the imaging unit.

10. An image communication method comprising:
 processing an image signal for a picked-up image of at least one user object from a number n of objects, the number n being equal to or greater than 1;
 encoding the processed image signal and a voice signal of the user object, and generating information on the user object;
 transmitting the encoded image and voice signals of the user object and the information on the user object to a remote object apparatus of a remote object, from a number m of objects, the number m being equal to or greater than 1;
 receiving encoded image and voice signals of the remote object and the information on the remote object from the remote object apparatus used by the remote object for the image communication;
 decoding at least one of the encoded image and voice signals of the user object, and the encoded image and voice signals of the remote object;
 displaying at least one of the decoded image signal of the user object and the decoded image of the remote object, and outputting at least one of the decoded voice signal of the user object and the decoded voice signal of the remote object; and
 outputting a voice guidance announcement based on the information on the remote object.

11. The image communication method according to claim 10, further comprising, prior to the displaying, receiving and scaling at least one of the decoded image signal of the user object and the decoded image signal of the remote object.

12. The image communication method according to claim 10, wherein the encoding the image signal of the user object comprises encoding the image signal of the user object using a moving picture compression algorithm of the moving picture experts group (MPEG)-4.

13. The image communication method according to claim 12, wherein the encoding the image signal of the user object using the moving picture compression algorithm comprises:
 cropping a portion of an entire imaging area of an imaging unit of an image communicating display apparatus, and
 moving the cropped portion along movement of the user object to locate the user object at a center area of a screen.

14. The image communication method according to claim 10, wherein the transmitting comprises stopping the transmission of the encoded image signal of the user object if it is determined that an image of the user object is not present in an imaging unit of an image communicating display apparatus.

15. The image communication method according to claim 10, wherein the transmitting comprises transmitting a last image of the user object as a freeze frame if the user object stops moving.

16. The image communication method according to claim 10, wherein the outputting the voice guidance announcement comprises outputting the voice guidance announcement if the remote object enters and exits from an angle of view of an imaging unit of the remote object apparatus.

17. The image communication method according to claim 10, wherein the information on the remote object comprises:
 information on the number m of the remote objects, and
 information on entrance and exit of the remote object with respect to an angle of view of an imaging unit of the remote object apparatus.

18. The image communication method according to claim 10, wherein the information on the user object comprises:
 information on the number n of the user objects, and information on entrance and exit of the user object with respect to an angle of view of an imaging unit of an image communicating display apparatus.

* * * * *